US008762347B1

(12) United States Patent
Gokhale et al.

(10) Patent No.: US 8,762,347 B1
(45) Date of Patent: Jun. 24, 2014

(54) METHOD AND APPARATUS FOR PROCESSING TRANSACTIONAL FILE SYSTEM OPERATIONS TO ENABLE POINT IN TIME CONSISTENT FILE DATA RECREATION (75) Inventors: Aditya Anil Gokhale, Maharashtra (IN); Aswad Shrikrishna Kulkarni, Maharashtra (IN); Carl J. Appellof, Arroyo Grande, CA (US); Russell Robert Stringham, Orem, UT (US); Dale Cardin, San Luis Obispo, CA (US)

(73) Assignee: Symantec Corporation, Mountain View, CA (US)

( * ) Notice: Subject to any disclaimer, the term of this patent is extended or adjusted under 35 U.S.C. 154(b) by 815 days.

(21) Appl. No.: 12/235,304

(22) Filed: Sep. 22, 2008

(51) Int. Cl.
*G06F 17/30* (2006.01)
(52) U.S. Cl.
USPC .......................................... 707/682; 707/649
(58) Field of Classification Search
CPC ............. G06F 9/466; G06F 17/30067; G06F 17/30371; G06F 17/30368; G06F 11/1446; G06F 17/30227; G06F 11/1471; G06F 11/1474; G06F 17/30008
USPC ................................................. 707/674–782
See application file for complete search history.

(56) References Cited

U.S. PATENT DOCUMENTS

| | | | | |
|---|---|---|---|---|
| 5,386,554 A * | 1/1995 | Nozaki | .................................. | 1/1 |
| 6,119,129 A * | 9/2000 | Traversat et al. | ...................... | 1/1 |
| 6,877,109 B2 * | 4/2005 | Delaney et al. | ............... | 714/6.32 |
| 6,934,877 B2 | 8/2005 | Tamatsu | | |
| 7,076,508 B2 * | 7/2006 | Bourbonnais et al. | ................. | 1/1 |
| 7,389,303 B2 * | 6/2008 | Verma et al. | ........................... | 1/1 |
| 7,543,000 B2 * | 6/2009 | Castro et al. | ........................... | 1/1 |
| 7,650,369 B2 * | 1/2010 | Taniguchi et al. | ............. | 707/672 |
| 2003/0046258 A1 * | 3/2003 | Candee et al. | ..................... | 707/1 |
| 2005/0223164 A1 * | 10/2005 | Kitamura | ....................... | 711/112 |
| 2006/0004877 A1 * | 1/2006 | Ishikawa et al. | ............... | 707/200 |
| 2007/0078800 A1 * | 4/2007 | Love et al. | ......................... | 707/1 |
| 2007/0083570 A1 * | 4/2007 | Fineberg | ........................ | 707/203 |
| 2010/0042626 A1 * | 2/2010 | Verma et al. | ....................... | 707/8 |
| 2011/0173093 A1 * | 7/2011 | Psota et al. | .................. | 705/26.35 |
| 2012/0011100 A1 * | 1/2012 | Yamane et al. | ................ | 707/649 |

FOREIGN PATENT DOCUMENTS

WO   WO0101250 A1 *   1/2001

OTHER PUBLICATIONS

Moravan et al, Supporting Nested Transactional Memory in LogTM, 2006 ACM, pp. 1-12.*
Chigrik, Alexander, "Backup and restore databases and transaction logs," downloaded from web site http://www.mssqlcity.com/Articles/Adm/backup_database.htm on Oct. 24, 2008.

(Continued)

*Primary Examiner* — Fred I Ehichioya
*Assistant Examiner* — Michelle Owyang
(74) *Attorney, Agent, or Firm* — Campbell Stephenson LLP (57) ABSTRACT

A method and apparatus for processing transactional file system operations to enable point in time consistent file data recreation and recovery from transactional file systems is described. In one embodiment, the method includes processing input/output activity associated with file data that is used in a computing environment to identify at least one transaction and segregating the input/output activity based upon the at least one transaction to enable point in time consistent data recreation for the file data.

20 Claims, 5 Drawing Sheets

(56) References Cited

OTHER PUBLICATIONS

"CICS Administration Guide for Windows Systems," downloaded from web site http://publib.boulder.ibm.com/infocenter/txformp/v5r1/index.jsp?topic=/com.ibm.txseries510.doc/erzhnb00110.htm on Oct. 24, 2008.

"How to: Restore a Transaction Log Backup (SQL Server Management Studio)," SQL Server 2008 Books Online (Aug. 2008).

"Microsoft Exchange Server Resource Site: Articles & Tutorials," Copyright 2008 TechGenix Ltd.

\* cited by examiner

METHOD AND APPARATUS FOR PROCESSING TRANSACTIONAL FILE SYSTEM OPERATIONS TO ENABLE POINT IN TIME CONSISTENT FILE DATA RECREATION

BACKGROUND OF THE INVENTION

1. Field of the Invention

Embodiments of the present invention generally relate to a data protection system and, more importantly, to a method and apparatus for processing transactional file systems operations to provide point in time consistent file data to support file data recovery and replication from transactional file system.

2. Description of the Related Art

In a typical computing environment, one or more computing devices use a variety of resources to process and store file data. For example, employees within a large organization use computers, data storage devices, networking components and/or the like for performing the day-to-day activities. The employees may store the file data in the data storage devices in the form of data volumes for retrieval at a later date. Occasionally, the file data in the data volumes becomes corrupted or erroneous and a previous storage state of the file data is needed to avoid a disruption in the day-to-day activities of the organization.

Many organizations use a variety of data protection systems to preserve storage states of the data volumes in case of a disaster. For example, a snapshot of the data volume at a particular point-in-time may be captured through a snapshot service in order to facilitate recovery of lost or corrupted data (e.g., files, emails and/or the like). In other words, the snapshot is a representation of a storage state of the data volume at the particular point-in-time. Furthermore, a continuous data protection system is configured to recreate any version of a file existing at any point-in-time using the captured snapshot and a log or journal of input/output activity for that file.

The data volumes may be organized into files and directories (i.e., a file system, such as File Allocation Table (FAT), New Technology File System (NTFS)). For example, the data volumes may be organized in accordance with a transactional file system, such as Transactional NTFS. Generally, a transactional file system volume is fault-tolerant and consistent. A transaction can either be finished completely (e.g., a committed transaction) or reverted completely (e.g., a rolled back transaction), but not necessarily both at any given point in time. This means that if there is a crash or power failure, after recovery, the storage state of the data volume will be consistent. A significant amount of computing overhead, however, is required to maintain data consistency.

Current data protection systems are unable to restore or replicate file data associated with a transaction that was in progress during the snapshot of the data volume. For example, mounting a snapshot causes any in progress (i.e., incomplete) transactions to be rolled back. As such, the snapshot does not include file data that is point in time consistent. Hence, the use of transactions prevents the data protection software from recreating point in time consistent file data from the snapshot. In addition, the file data may only be replicated or recovered to a data volume that supports transactional file systems. Transactional file system operations cannot be played on a non-transactional file system.

Therefore, there is a need in the art for a method and apparatus for processing transactional file system operations to enable point in time consistent file data recreation and recovery from transactional file systems.

SUMMARY OF THE INVENTION

Embodiments of the present invention generally comprise a method and apparatus for processing transactional file system operations to enable point in time consistent file data recreation and recovery from transactional file systems. In one embodiment, a method for processing transactional file system operations to provide point in time consistent file data comprises processing input/output activity associated with file data that is used in a computing environment to identify at least one transaction and segregating the input/output activity based upon the at least one transaction to enable point in time consistent data recreation for the file data.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
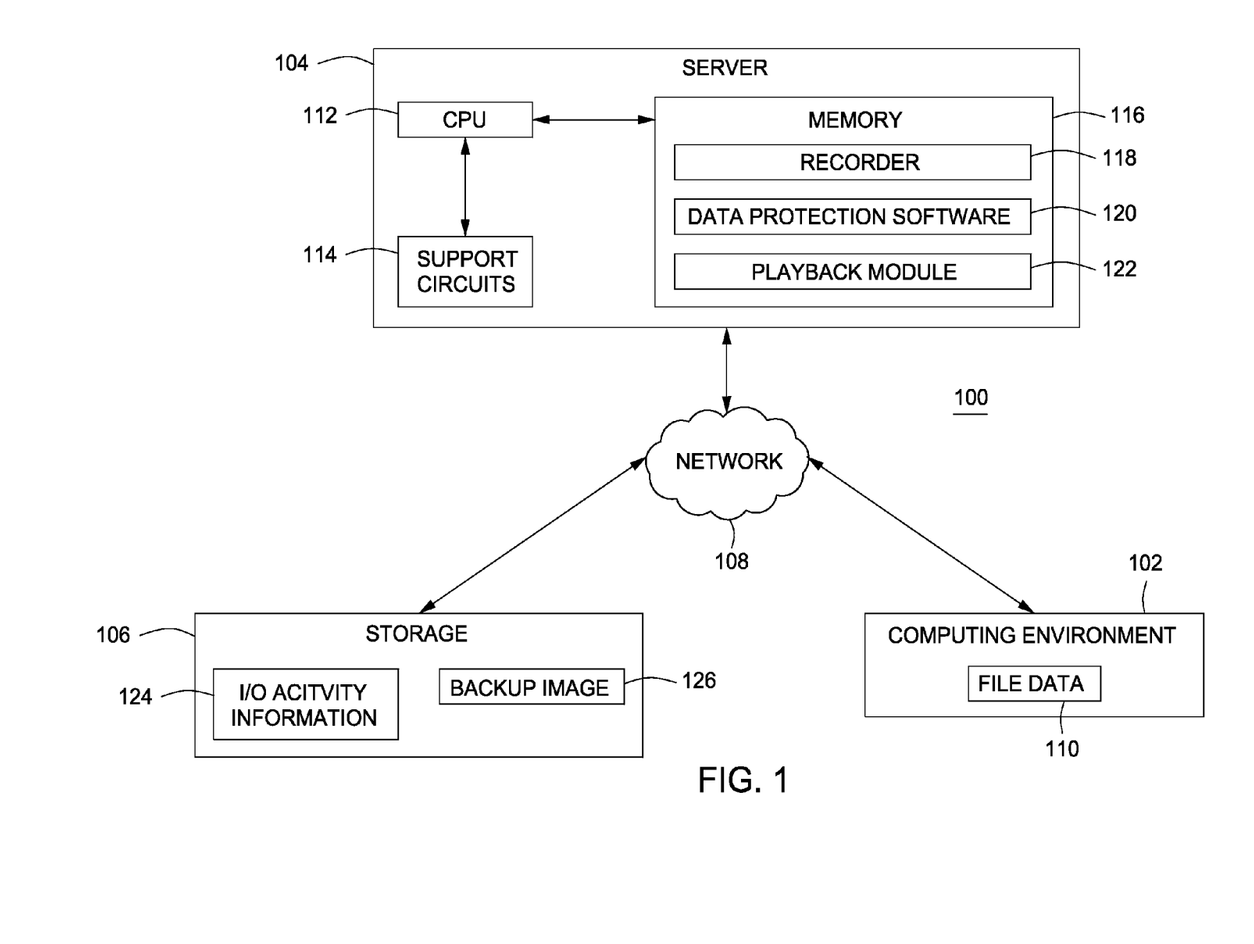
FIG. 1 is a block diagram of a system for processing transactional file system operations to enable point in time consistent file recreation according to one or more embodiments of the present invention.

FIG. 1 is a block diagram of a system 100 for processing transactional file system operations to enable point in time consistent file recreation according to one or more embodiments of the present invention. The system 100 includes a computing environment 102, a server 104 and a storage 106 in which each is coupled to each other through a network 108.

The computing environment 102 provides various computer resources (e.g., storage, network, file system, backup, restore and/or the like) to one or more client computers. Furthermore, the one or more client computers in the computing environment 102 produce various forms of information (e.g., customer data, application data, financial data and/or the like) that is stored as file data 110 (e.g., a volume that comprises a number of files in accordance with a file system). The file data 110 may be backed up by the server 104 to the storage 106 through the network 108 according to one or more embodiments.

The server 104 is a type of computing device (e.g., a laptop, a desktop, a Personal Desk Assistant (PDA), a tablet, a mobile phone and the like) that comprises a central processing unit (CPU) 112, various support circuits 114 and a memory 116.

The CPU 112 may comprise one or more commercially available microprocessors or microcontrollers that facilitate data processing and storage. Various support circuits 114 facilitate operation of the CPU 112 and may include clock circuits, buses, power supplies, input/output circuits and/or the like. The memory 116 includes a read only memory, random access memory, disk drive storage, optical storage, removable storage, and the like. The memory 116 further includes various software packages, such as a recorder 118, data protection software 120 and a playback module 122.

The storage 106 generally includes various components (i.e., hardware and software) that are configured to manage storage resources. The storage 106 may include one or more data storage devices (e.g., hard disk drives, optical drives, magnetic tape drives, a storage array (e.g., a RAID configuration) and/or the like), one or more storage controllers and software that provides an interface (e.g., Integrated Drive Electronics/AT Attachment (IDE/ATA), Small Computer Systems Interface (SCSI) and/or the like) to the one or more data storage devices for the server 104. The storage 106 includes input/output activity information 124 and a backup image 126.

The network 108 comprises a communication system that connects computers by wire, cable, fiber optic, and/or wireless links facilitated by various types of well-known network elements, such as hubs, switches, routers, and the like. The network 108 may employ various well-known protocols to communicate information amongst the network resources. For example, the network 108 may be part of the Internet or intranet using various communications infrastructure such as Ethernet, WiFi, WiMax, General Packet Radio Service (GPRS), and the like. Furthermore, the network 106 may form a portion of a Storage Network Area (SAN) using various communications infrastructure such as Ethernet, Fibre Channel, InfiniBand, and the like.

Generally, the input/output activity information 124 includes one or more storage and/or file system operations associated with the file data 110 and stored in one or more journals or streams. In one embodiment, the input/output activity information 124 includes one or more transactional and non-transactional file system operations. As explained further below, the input/output activity information 124 may segregated into one or more transactional journals and/or one or more non-transactional journals.

The backup image 126 may be organized in a proprietary format to represent a storage state of a volume (i.e., the file data 110) according to one or more embodiments. The backup image 126 may be generated by the data protection software 120 (e.g., SYMANTEC NetBackup products, SYMANTEC BackupExec products, snapshot software and/or the like). In one embodiment, the backup image 126 (e.g., a full backup image or an incremental backup image) includes the file data 110. In another embodiment, the backup image 126 (e.g., a snapshot image) includes references or pointers to addresses (e.g., locations of files) within the file data 110. In one embodiment of the present invention, the backup image 126 is a point in time consistent copy of the file data 110 at a particular point in time (i.e., a recovery or backup point).

The storage 106 facilitates permanent storage (i.e., a backup) of a storage state of the file data 110 at one or more points in time. In one embodiment, the file data 110 at the particular point in time is stored as the backup image 126. In addition, subsequent input/output activity (e.g., file system operations) is recorded in the input/output (I/O) activity information 124. In one embodiment, the input/output activity information 124 may be played back to recover the file data 110 at a later point in time. In another embodiment, the input/output activity information 124 may be used to update the backup image 126 to represent the file data 110 at the later point in time. Accordingly, the updated backup image 126 includes a copy of the file data 110 that is consistent with the later point in time.

The recorder 118 includes software code that is configured to record input/output activity associated with the file data 110. In one embodiment, one or more transactions are applied to the file data 110 during the input/output activity. Furthermore, the recorder 118 segregates the input/output activity based upon one or more transactions. For example, the input/output activity is transmitted to the recorder 118 as a single journal (e.g., a chain of file system operations) and then, split into one or more transactional journals and/or a non-transactional journal where each transaction is recorded in a journal of the one or more transactional journals. In one embodiment, the segregated input/output activity is stored as the input/output activity information 124.

In another embodiment, the input/output activity is stored in the input/output activity information 124 as the single journal. At a later date (e.g., during system recovery), the recorder 118 segregates the single journal into one or more journals based on the one or more transactions to enable point in time consistent file recreation. For example, the single journal is split into a number of journals in which one or more journals are associated with one or more incomplete transactions at a particular point in time (e.g., rolled back transactions when a snapshot image is mounted). As another example, the single journal is split into one or more pre-snapshot transactional journals, one or more post-snapshot transactional journals and one or more non-transactional journals.

In one embodiment, the recorder 118 stores one or more file system operations that are prior to and/or subsequent to a backup (e.g., a snapshot, a full backup and/or the like) of the file data 110 in the input/output information 124. The one or more file system operations may be associated with one or more transactions and/or one or more non-transactions that are applied to the file data 110 before and/or after the generation of the backup image 126. Furthermore, the recorder 118 segregates the one or more file system operations based upon the one or more transactions.

In one embodiment, the recorder 118 stores one or more transactional file system operations that are applied before the generation of the backup image 126 (e.g., a snapshot) in a pre-snapshot transactional journal. In another embodiment, the recorder 118 splits the pre-snapshot transactional journal operations that are applied before the generations into a journal for incomplete transactions (e.g., one or more transaction in progress during the generation of the snapshot) and a journal for completed transactions. As explained further below, the journal for incomplete transactions may be used to update the snapshot to be point in time consistent. Additionally, the recorder 118 stores one or more file system operations (transactional and non-transactional) after the generation of the backup image 126 in a post-snapshot journal.

In another embodiment, the recorder 118 stores the one or more file system operations in a stream or a journal as a chain of events (i.e., in order of application on the file data 110). Alternately, the recorder 118 segregates the one or more file system operations into multiple journals during recordation. In either embodiment, the one or more file system operations are split into one or more journals for the one or more transactions. Accordingly, the input/output information 124 includes a journal for each of the one or more transactions and a journal for all of the one or more non-transactions.

For example, the recorder 118 segregates the input/output activity information 124 based on transaction ids of the one or more file system operations. For each transaction id, the recorder 118 creates a journal and stores each and every file system operation associated with the transaction id in the journal. As the recorder 118 processes a particular file system operation for recordation, the recorder 118 selects a journal that corresponds with a transaction id of the particular file system operation according to one embodiment. In one embodiment, the transaction id of non-transactions is NULL or 0. As such, file system operations having such a transaction id are stored in the non-transactional journal.

The recorder 118 segregates the input/output information 124 to enhance replication and/or recovery of the file data according to one embodiment. A copy of the segregated input/output information 124 permits the playback module 122 to use non-transactional file system functions to replay transactional file system operations. For example, the data protection software 120 may use non-transactional versions of "read", "write", "open" and "close" functions to perform corresponding transactional versions. The removal of "commit" and "roll back" file system operations permits data recovery or replication between transactional and non-transactional file systems. Therefore, the data protection software 120 may restore or replicate a data volume in a transactional file system to a data volume a non-transactional file system and vice versa.

In one embodiment, the recorder 118 grooms the one or more post-snapshot journals. For example, the one or more post-snapshot journals may include file system operations for completed transactions (e.g., the one or more in-progress transactions). Naturally, the completed transactions may either be committed or rolled back. A post-snapshot journal associated with a rolled back transaction may be deleted because the file system operations were never fully applied to the data volume. Hence, the one or more post-snapshot journal is groomed of the rolled back transaction. In another embodiment, the recorder 118 grooms the one or more pre-snapshot transactional journals of any rolled back transactions.

In yet another embodiment, the recorder 118 grooms one or more transactional journals and a non-transactional journal. As mentioned herein, the input/output information 124 may be segregated into a transactional journal for each transaction of the one or more transactions and a journal for all non-transactions based on transaction ids of the file system operations. For example, the recorder 118 may identify a rollback file system operation in a particular transactional journal and remove the transactional journal from the input/output activity information 124. Alternatively, upon processing a rollback file system operation for recordation, the recorder 118 deletes a transactional journal having a matching transaction id as the rollback file system operation.

As another example, the recorder 118 may identify a commit operation in a particular transactional journal and associate the particular transactional journal with the non-transactional journal. For example, the recorder 118 associates the particular transactional journal with the non-transactional journal using related file names, transaction IDs and/or the like. Since the transaction associated with the particular transactional journal is committed, the one or more file system operations may be replayed by the playback module 122 using corresponding non-transactional functions. Alternatively, upon processing a commit file system operation for recordation, the recorder 118 associates a transactional journal having a matching transaction id as the commit file system operation with the non-transactional journal.

As yet another example, the recorder 118 may determine that one or more portions of a particular journal (e.g., a transaction journal and/or a non-transaction journal) are to be groomed (i.e., removed) after a period of time. For instance, the particular journal may be a transactional journal that is no longer needed for restoration and/or replication because a point in time consistent backup image that post-dates the transactional journal is available. Furthermore, the transactional journal may be associated with a non-transactional journal when the transaction is committed. As such, the recorder 118 deletes the associated transactional journal while grooming the non-transactional journal.

The playback module 112 includes software for facilitating point in time consistent recovery and/or replication of the file data 110 in the computer environment 102. In one embodiment, the playback module 122 is configured to use the backup image 126 and the input/output activity information 124 to create (i.e., recreate) files that are consistent with a recovery point for the file data 110 (e.g., a data volume in the computing environment 102). In operation, the playback module 122 mounts the backup image 126 to access a storage state of the file data 110 (e.g., a data volume). In one embodiment, the playback module 122 updates the backup image 126 using a segregated copy of input/output information 124.

For example, the playback module 122 uses one or more pre-snapshot transactional journals to update a mounted snapshot image with one or more transactions that were in progress during the snapshot of the data volume. Mounting the snapshot image causes a rollback of the one or more in progress transactions. The one or more pre-snapshot transactional journals indicate one or more file system operations associated with the one or more in progress transactions and prior to a timestamp of the snapshot. Such file system operations are applied to the mounted snapshot image to update the data volume. As a result, the storage state of the data volume is consistent with the timestamp of the snapshot.

Subsequently, the playback module 122 may use one or more post-snapshot journals to modify the mounted snapshot image to be point in time consistent with a recovery point. The one or more post-snapshot journals may include one or more file system operations for one or more transactions and/or one or more non-transactions that were performed after a timestamp of the snapshot. Such file system operations may be applied to the mounted snapshot image until the recovery point. As a result, the mounted snapshot image includes a point in time consistent data volume.

Figure 2:
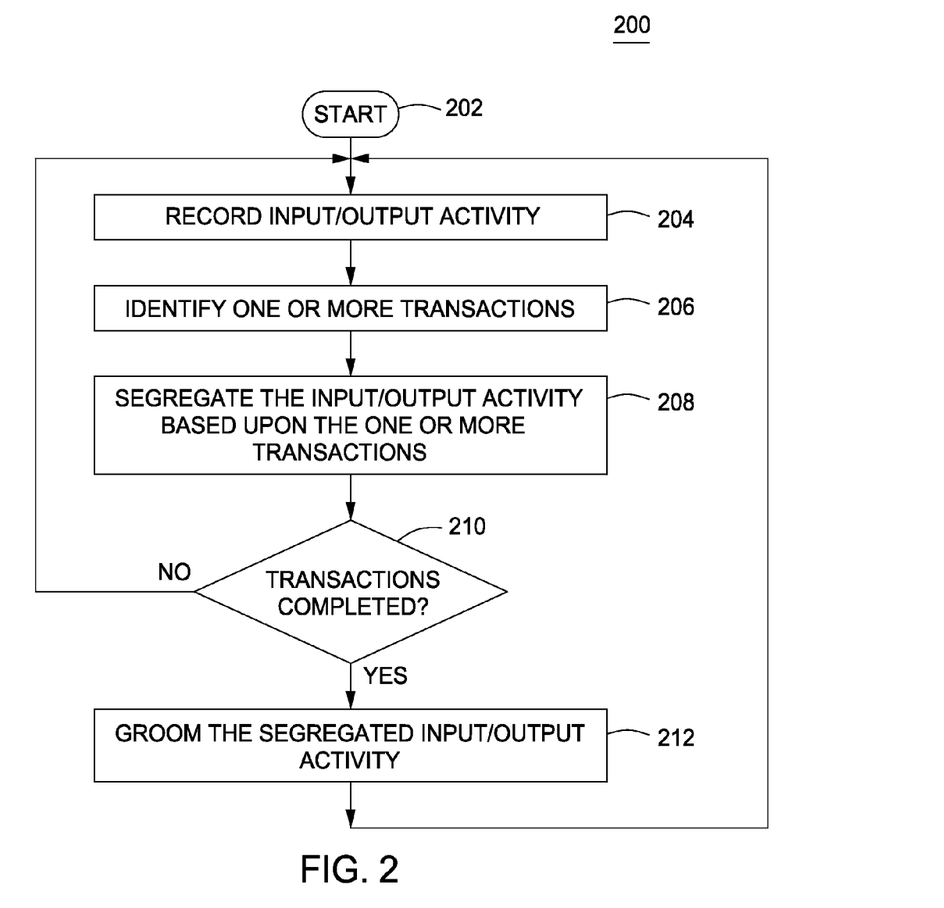
FIG. 2 is a flow diagram of a method for processing transactional file system operations to enable point in time consistent file recreation according to one or more embodiments of the present invention.

FIG. 2 is a method 200 for processing transactional file system operations to enable point in time consistent file recreation according to one or more embodiments of the present invention. The method 200 starts at step 202 and proceeds to step 204.

At step 204, input/output activity is recorded. At step 206, one or more transactions are identified. At step 208, the input/output activity (e.g., the input/output activity information 124 of FIG. 1) is segregated based upon the one or more transactions. At step 210, a determination is made as to whether the one or more transactions are completed. If it is determined that a transaction of the one or more is incomplete, then the method 200 returns to step 204. If it is determined that the one or more transactions are completed, then the method 200 proceeds to step 212. At step 212, the segregated input/output activity is groomed. After step 212, the method 200 returns to step 204.

Figure 3:
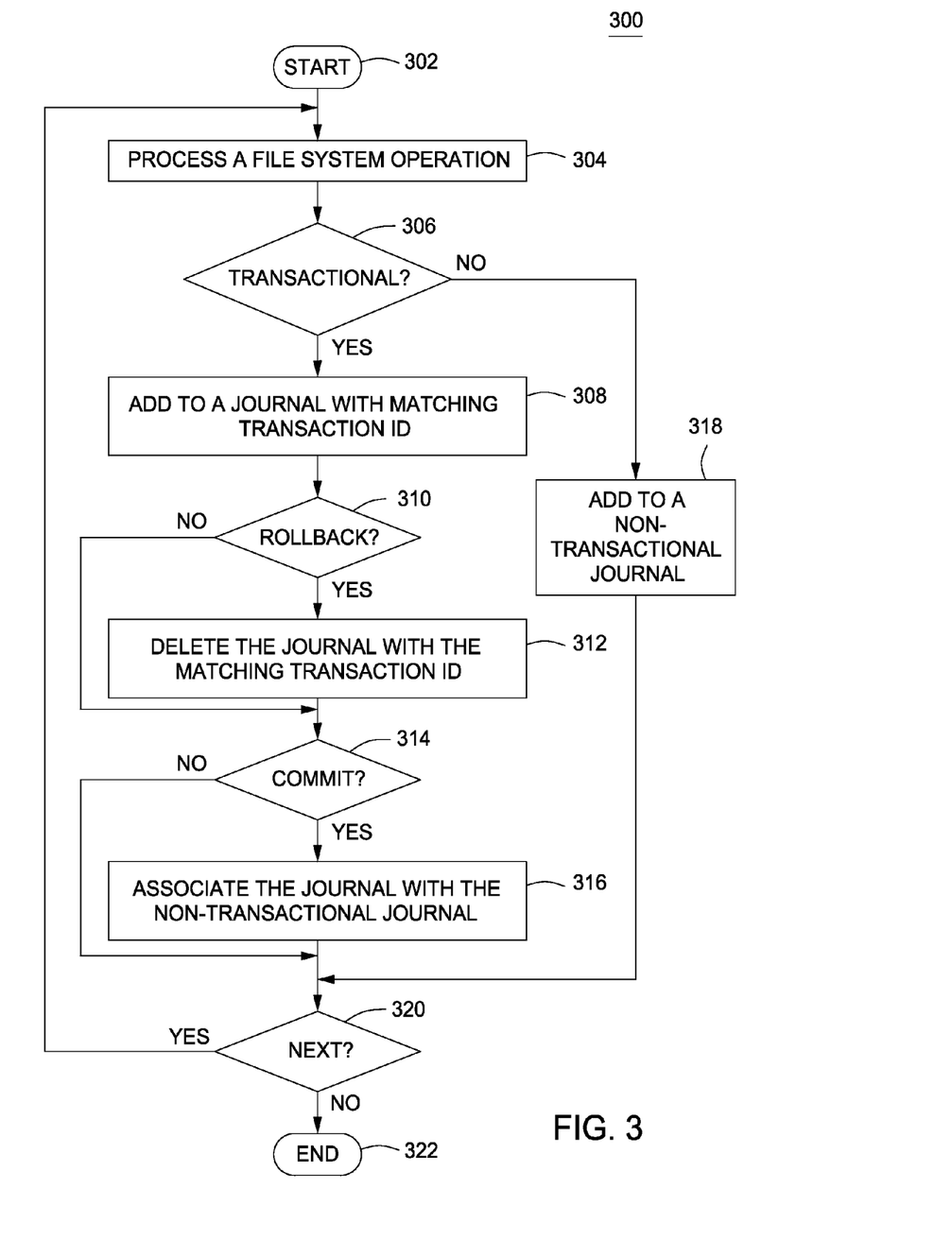
FIG. 3 is a flow diagram of a method for segregating the input/output activity information according to one or more embodiments of the present invention.

FIG. 3 is a method 300 for segregating the input/output activity according to one or more embodiments of the present invention. The method 300 starts at step 302 and proceeds to step 304.

At step 304, a file system operation is processed. At step 306, a determination is made as to whether the file system operation is transactional. If it is determined that the file system operation is transactional, then the method 300 proceeds to step 308. At step 308, the file system operation is added to a journal with a matching transaction id. If it is determined that the file system operation is non-transactional, then the method 300 proceeds to step 318. At step 318, the file system operation is added to a non-transactional journal.

At step 310, a determination is made as to whether the file system operation is a roll back operation. If it is determined that the file system operation is a roll back operation, then the method 300 proceeds to step 312. If it is determined that the file system operation is not a roll back operation, then the method 300 proceeds to step 314. At step 312, the journal with the matching transaction id is deleted. Accordingly, the transactional journals are groomed and the journal with the matching transaction id is removed.

At step 314, a determination is made as to whether the file system operation is a commit operation. If it is determined that the file system operation is not a commit operation, then the method 300 proceeds to step 318. If it is determined that the file system operation is a commit operation, then the method 300 proceeds to step 316. At step 316, the journal with the matching transaction id is associated with a non-transactional journal. Subsequently, the method 300 proceeds to step 320. At step 320, a determination is made as to whether there is a next file system operation. If it is determined that there is a next file system operation, then the method 300 returns to 304. If it is determined that there is no next file system operation, then the method 300 proceeds to 322. At step 322, the method 300 ends.

Figure 4:
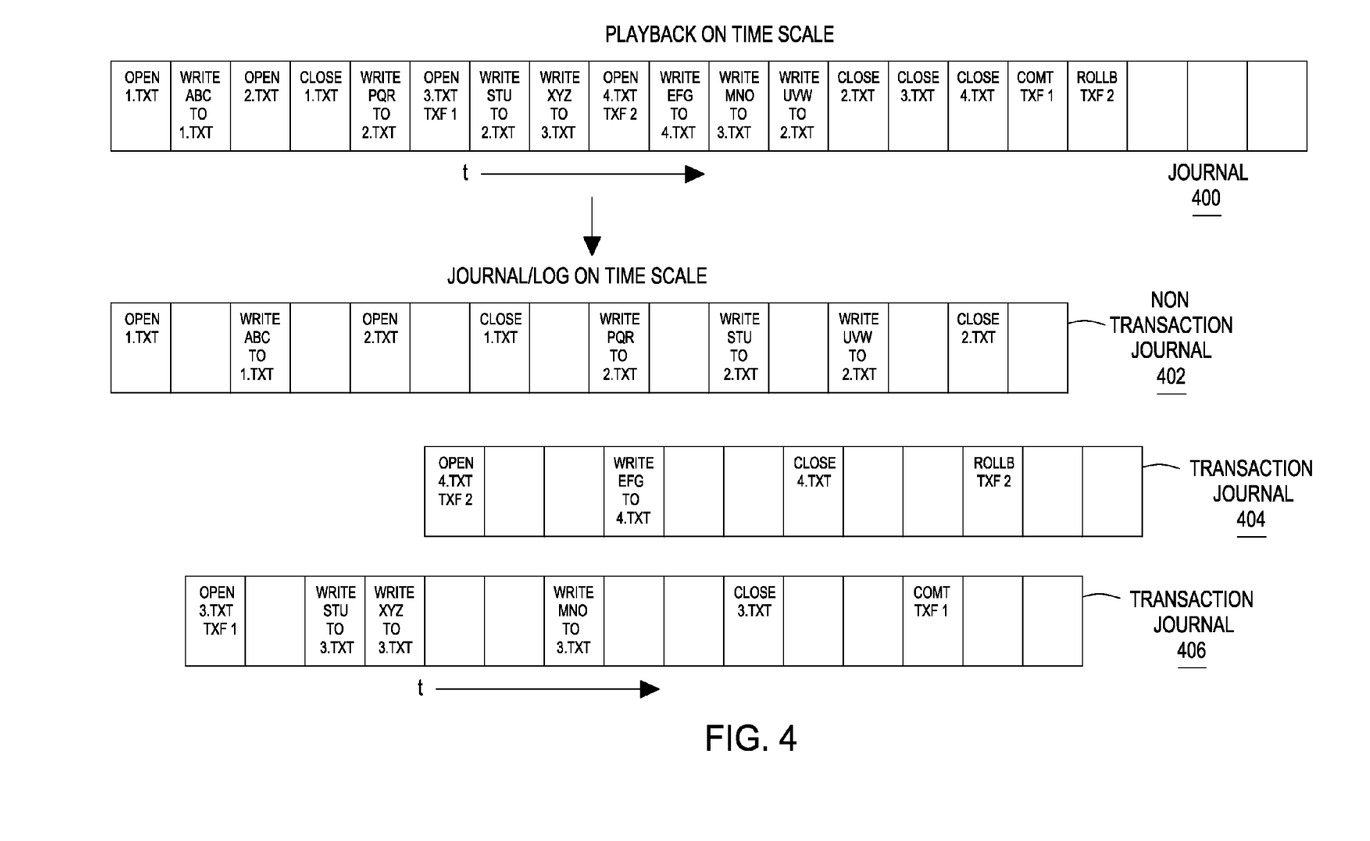
FIG. 4 is an illustration of segregation input/output activity information according to one or more embodiments of the present invention.

FIG. 4 illustrates segregated input/output activity information according to one or more embodiments of the present invention. In one embodiment, the input/output activity information is stored in a journal 400 as a chain of file system operations on a time scale. The journal 400 is segregated (e.g., by the recorder 118 of FIG. 1) into a non-transactional journal 402, a transactional journal 404 and a transactional journal 406.

Accordingly, each non-transactional file system operation is segregated from the journal 400 and stored in the non-transactional journal 402. For example, file system operations "Open 1.TXT" and "WRITE ABC to 1.TXT" are determined to be not associated with a transaction (e.g., transaction id=0). Hence, file system operations "Open 1.TXT" and "WRITE ABC to 1.TXT" are stored in the non-transactional journal 202 to segregate from file system operations associated with a transaction "TXF 1" or a transaction "TXF 2."

Furthermore, each transactional file system associated with the transaction "TXF 1" or the transaction "TXF 2" is segregated from the journal 400 and stored in the transactional journal 406 or the transactional journal 404, respectively. For example, the file system operation "Open 4.TXT" is determined to be associated with the transaction "TXF 2". The transactional journal 404 is associated with a transaction id that matches the transaction "TXF 2". As such, the file system operation "Open 4.TXT" is stored in the transactional journal 404. As another example, the file system operation "Open 3.TXT" is determined to be associated with the transaction "TXF 1". The transactional journal 406 is associated with a transaction id that matches the transaction "TXF 1". Therefore, the file system operation "Open 3.TXT" is stored in the transactional journal 406.

Additionally, the transactional journal 404 and the transactional journal 404 may be groomed to optimize data recovery. For instance, a rollback file system operation for the second transaction is identified in the journal 400 and/or the transactional journal 404. As such, the transactional journal 404 may be deleted from the input/output activity information. Moreover, a commit file system operation for the transaction "TXF 1" is identified in the journal 400 and/or the transactional journal 406. Hence, the transactional journal 406 may be associated with the non-transactional journal 402 because the transaction "TXF 1" is completed and the file system operations may become visible to any process.

Optionally, a snapshot may be generated at any point in time within the journal 400. As an example, the snapshot may be generated while the second transaction is currently in progress (i.e., not completed). As such, the transactional journal 404 may be further segregated into a pre-snapshot transactional journal and a post-snapshot transactional journal. Furthermore, because the second transaction is rolled back, the pre-snapshot transactional journal and the post-snapshot transactional journal may be deleted.

Figure 5:
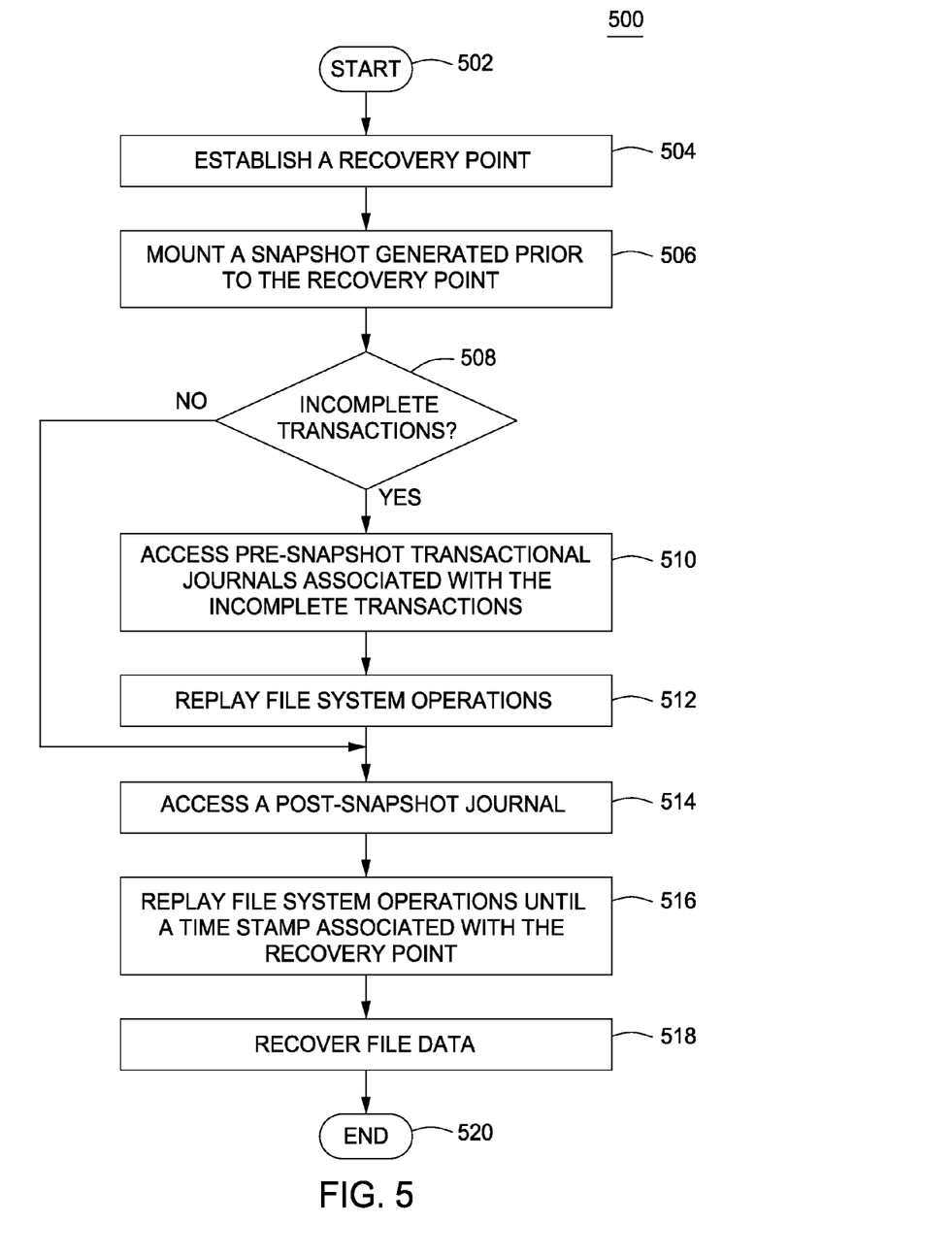
FIG. 5 is a flow diagram of a method for providing a point in time consistent snapshot to enable recovery of file data according to one or more embodiments of the present invention.

FIG. 5 is a method 500 for providing a point in time consistent snapshot to enable recovery of file data according to one or more embodiments of the present invention. The method 500 starts at step 502 and proceeds to step 504.

At step 504, a recovery point is established. At step 506, a snapshot generated prior to the recovery point is mounted (e.g., a snapshot having a timestamp before the recovery point). At step 508, a determination is made as to whether there are one or more incomplete transactions (e.g., transactions in progress at the timestamp associated with the generation of the snapshot). If it is determined that there are one or more incomplete transactions, then the method 500 proceeds to step 510. If it is determined that there are no incomplete transactions, then the method 500 proceeds to step 514.

At step 510, one or more pre-snapshot transactional journals are accessed. At step 512, one or more file system operations are replayed. In one embodiment, the one or more file system operations are applied to the snapshot. Hence, the snapshot is update to be consistent with the point in time associated with the generation of the snapshot. At step 514, a post-snapshot journal is accessed. Alternatively, one or more post-snapshot transactional journals and a post-snapshot non-transactional journal are accessed as explained above. At step 516, one or more file system operations are replayed until a timestamp associated with the recovery point. At step 518, file data is recovered from the updated snapshot that is point in time consistent with the recovery point. At step 520, the method 500 ends.

While the foregoing is directed to embodiments of the present invention, other and further embodiments of the invention may be devised without departing from the basic scope thereof, and the scope thereof is determined by the claims that follow.

The invention claimed is:

1. A computer-implemented method comprising:
recording a first transactional file system operation in a journal, wherein
the first transactional file system operation is associated with a first transaction identifier (id);
recording a second transactional file system operation in the journal, wherein
the second transactional file system operation is associated with a second transaction id;
recording at least one non-transactional file system operation in the journal, wherein
the at least one non-transactional file system operation is not associated with a transaction id, and the first and second transactional file system operations and the at least one non-transactional file system operation are associated with file data that is used in a computing environment;
splitting the journal into a plurality of journals to recreate point in time consistent data for the file data, wherein the splitting comprises:
adding the at least one non-transactional file system operation to a non-transactional journal,
adding the first transactional file system operation to a first transactional journal based on the first transaction id, and
adding the second transactional file system operation to a second transactional journal based on the second transaction id; and
splitting the first transactional journal into a third transactional journal that comprises operations belonging to one or more completed transactions and a fourth transactional journal that comprises operations belonging to one or more incomplete transactions.

2. The method of claim 1, further comprising:
identifying a rollback operation associated with the first transaction id; and
deleting a transactional journal having a matching transaction id.

3. The method of claim 1, comprising:
identifying a commit operation associated with the first transaction id;
selecting a transactional journal having a matching transaction id; and
associating the transactional journal with the non-transactional journal.

4. The method of claim 1, wherein the splitting further comprises:
determining at least one transactional file system transaction that is incomplete during generation of a snapshot of the file data; and
storing at least one transactional file system operation of the at least one incomplete transactional file system transaction having a timestamp before the snapshot of the file data in at least one pre-snapshot transactional journal.

5. The method of claim 4, further comprising:
storing at least one transactional file system operation of the at least one transactional file system transaction having a timestamp after the snapshot of the file data snapshot in a post-snapshot journal.

6. The method of claim 1, further comprising:
establishing a recovery point; and
mounting an image that represents the file data before the established recovery point.

7. The method of claim 6, further comprising:
applying at least one transactional file system operation to the image, wherein the image is updated to represent the file data at a point in time that is consistent with the established recovery point.

8. The method of claim 7, wherein applying the at least one transactional file system operation is applied further comprises: replaying a transactional file system operation of the at least one transactional file system operation using a corresponding non-transactional file system function.

9. The method of claim 7 further comprising:
selecting a file of the file data for recovery; and
restoring the file from the updated image.

10. The method of claim 6 further comprising:
determining at least one transactional file system transaction that is in progress upon the mounting of the image;
replaying at least one transactional file system operation associated with the at least one in progress transactional file system transaction and recorded before a point in time associated with the image to update the image to represent the file data at the point in time associated with the image; and
replaying at least one transactional file system operation recorded after the point in time associated with the image to update the image to represent the file data at the established recovery point.

11. The method of claim 10, further comprising:
identifying a rollback operation associated with at least one in progress transactional file system transaction; and
modifying the image to undo at least one file system operation associated with the rolled back operation of the at least one in progress transactional file system transaction.

12. The method of claim 10, further comprising:
identifying a commit operation associated with at least one in progress transactional file system transaction;
updating the image with at least one file system operation associated with the committed operation, wherein the updated image is visible to at least one process.

13. The computer-implemented method of claim 1, further comprising:
restoring data from backup copy of a first volume of a transactional file system to a second volume of a non-transactional file system using the journal.

14. The computer-implemented method of claim 2, further comprising:
deleting an associated non-transactional journal in response to detecting removal of the transactional journal.

15. An apparatus comprising:
a processor;
a memory, coupled to the processor, comprising a recorder configured to:
record a first transactional file system operation in a journal, wherein
the first transactional file system operation is associated with a first transaction identifier (id),
record a second transactional file system operation in the journal, wherein
the second transactional file system operation is associated with a second transaction id,
record at least one non-transactional file system operation in the journal, wherein
the at least one non-transactional file system operation is not associated with a transaction id, and
the first and second transactional file system operations and the at least one non-transactional file system operation are associated with file data that is used in a computing environment comprising the memory,
split the journal into a plurality of journals to recreate point in time consistent data for the file data, wherein splitting the journal comprises:
determining whether an operation is a transactional operation or a non-transactional operation,
adding the at least one non-transactional file system operation to a non-transactional journal,
adding the first transactional file system operation to a first transactional journal based on the first transaction id, and
adding the second transactional file system operation to a second transactional journal based on the second transaction id; and split the first transactional journal into a third transactional journal that comprises operations belonging to one or more completed transactions and a fourth transactional journal that comprises operations belonging to one or more incomplete transactions.

16. The apparatus of claim 15 further comprising data protection software for generating an image that represents the file data at a point in time.

17. The apparatus of claim 16 further comprising a playback module for mounting the image and applying at least one transactional file system operation associated with at least one in progress transactional file system transaction to the image to provide point in time consistent file data.

18. The apparatus of claim 15, wherein the recorder deletes at least one transactional journal associated with a rolled back transactional file system transaction.

19. A system comprising:
a computing environment, comprising a file comprising data;
a storage comprising a memory comprising a journal;
a server, comprising:
  a processor;
  a recorder configured to:
    record a first transactional file system operation in a journal, wherein
      the first transactional file system operation is associated with a first transaction identifier (id),
    record a second transactional file system operation in the journal, wherein
      the second transactional file system operation is associated with a second transaction id,
    record at least one non-transactional file system operation in the journal, wherein
      the at least one non-transactional file system operation is not associated with a transaction id, and
      the first and second transactional file system operations and the at least one non-transactional file system operation are associated with file data that is used in a computing environment comprising the memory,
  split the journal into a plurality of journals to recreate point in time consistent data for the file data, wherein splitting the journal comprises
    determining whether an operation is a transactional operation or a non-transactional operation,
    adding the at least one non-transactional file system operation to a non-transactional journal,
    adding the first transactional file system operation to a first transactional journal based on the first transaction id, and
    adding the second transactional file system operation to a second transactional journal based on the second transaction id;
  split the first transactional journal into a third transactional journal that comprises operations belonging to one or more completed transactions and a fourth transactional journal that comprises operations belonging to one or more incomplete transactions; and
a backup image that represents the file data at a point in time.

20. The system of claim 19, wherein the server further comprises a playback module for establishing a recovery point that is after the point in time of the backup image, mounting the backup image and replaying a portion of at least one transactional journal and at least one non-transactional journal to update the backup image to include file data that is point in time consistent with the established recovery point.

* * * * *